United States Patent Office 2,953,489
Patented Sept. 20, 1960

2,953,489

ADHESIVE COMPOSITION COMPRISING A POLY-ALKYLENEETHER - POLYURETHANE ELASTO-MER AND METHOD OF LAMINATING THERE-WITH

Charles A. Young, Wilmington, Del., assignor to E. I. du Pont de Nemours and Company, Wilmington, Del., a corporation of Delaware No Drawing. Filed Mar. 12, 1956, Ser. No. 570,708

6 Claims. (Cl. 154—139)

This invention relates to an adhesive composition and more particularly to an adhesive composition which is useful for adhering a polyurethane elastomer to itself in the manufacture of tires.

In building tires on a drum by adding a tread cap to a tire carcass, it is necessary to form a hoop of the tread stock by cutting an appropriate length from a long extruded ribbon of the tread stock and splicing the ends together. The adhesion between the spliced ends must be sufficiently good so that when the tire is expanded into the tire mold, it will not part and when cured in the mold, the spliced section is as strong as the rest of the tread. In addition, it is necessary that it be possible to cement the splice simply by holding the two surfaces together for a brief period without resorting to a special curing step. Since the curing agent, or agents, are already present in the tread cap, and in the green, uncured carcass, a special curing step would cause innumerable complications. If the splice cement is not adequate to adhere the spliced section of the tread stock, the splice will separate when the tire is expanded into the mold and may also leave a weak spot in the tread after curing. This problem of adequate adhesion is particularly acute in adhering the splice of a polyurethane tread stock, more specifically a polyurethane prepared from a polyalkylene ether glycol.

It is an object of the present invention to provide a new adhesive composition. A further object is to provide an adhesive composition which is useful for adhering the spliced section of polyurethane elastomer tread stocks in the manufacture of tires. Other objects will appear hereinafter.

These and other objects of the following invention are accomplished by the novel adhesive composition comprising (a) about 100 parts by weight of a polyurethane elastomer prepared from a polyalkylene ether glycol having a molecular weight of from 750 to 3000, a molar excess of an organic diisocyanate and a chain-extending agent; (b) from about 20 to 40 parts by weight of a reinforcing agent selected from the group consisting of conductive channel black and flame silica; (c) from about 2 to 10 parts by weight of an organic diisocyanate; and (d) from about 800 to 3000 parts by weight of an inert volatile organic solvent.

The polyurethane elastomer which is used in the adhesive composition of the present invention is prepared from a polyalkylene ether glycol having a molecular weight of 750 to 3000, a molar excess of an organic diisocyanate and a chain-extending agent. The process for the preparation of this elastomer may be carried out by several general procedures. Thus, the glycol may be reacted with the molar excess of an organic diisocyanate and the resulting isocyanate-terminated prepolymer then chain-extended. Another method of preparation involves the reaction of a molar excess of the glycol with the organic diisocyanate so as to prepare a hydroxyl-terminated polyurethane which is then further reacted with additional diisocyanate and subsequently chain-extended. These various methods of preparation of the elastomer are more particularly described in the following examples and in U.S. Patent 2,929,800 and U.S. Patent 2,871,227.

The polyalkylene ether glycols which are useful for preparing the polyurethane elastomers are represented by the formula $H(OR)_nOH$, wherein R is an alkylene radical which may be the same or different and $n$ is an integer sufficiently large so that the glycol will have a molecular weight of from 750 to 3000. These glycols may be prepared by the polymerization of cyclic ethers, such as ethylene oxide, propylene oxide, dioxolane and tetrahydrofuran. For purposes of the present invention, a polytetramethylene ether glycol having a molecular weight of about 1000 is preferred. Any of a wide variety of organic diisocyanates may be used to prepare the polyurethane elastomer; however, toluene-2,4-diisocyanate is preferred. Representative other diisocyanates include m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate.

The chain-extending agents which are used to prepare the polyurethane elastomers are active hydrogen-containing compounds capable of reacting with isocyanates. Water is the most desirable chain-extending agent and is preferred. There may also be employed organic compounds containing two atoms in the molecule to which are attached active hydrogen atoms. The term "active hydrogen atoms," refers to hydrogens which, because of their position in the molecule, display activity according to the Zerewitinoff Test as described by Kohler in J. Am. Chem. Soc. 49, 3181 (1927). In the chain-extending organic type compounds, the active hydrogen atoms are usually attached to oxygen, nitrogen or sulfur. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylene-diamine, bis(4-aminophenyl) methane, β-hydroxypropionic acid and 1,2-ethanedisulfonic acid.

The reinforcing agents which are used in the novel adhesive compositions of the present invention are conductive channel blacks or flame silica. The conductive channel blacks are smaller in particle size than most other channel blacks used in rubber technology and they are believed to form a skeletal structure when compounded into rubber. It is believed that these characteristics are the factors which cause these channel blacks to be the best suited for the adhesive composition of the present invention. Flame silica is quite different from the other silicas used in the rubber field in that it is hydrophobic and is in the form of very small spheres. It has been found that in the case of using silicas, only the flame silicas yield satisfactory adhesive compositions. The flame silicas are described in India Rubber World, vol. 129, p. 481 (1954). The adhesive compositions of the present invention should contain from about 20 to 40 parts by weight of these reinforcing agents. It is to be understood that mixtures of these reinforcing agents may be used.

The adhesive compositions of the present invention should contain from about 2 to 10 parts by weight of an organic diisocyanate. This organic diisocyanate acts as a curing agent for the polyurethane elastomer component of the composition. The particular diisocyanate which is used is not critical but preferably it should be one which is completely soluble in the inert volatile organic solvent. Suitable diisocyanates are toluene-2,4-diisocyanate, 4-tert-butyl-m-phenylene diisocyanate, 4,4′-methylenedi-o-tolylisocyanate, 1,6-hexamethylene diisocyanate, 4,4′-methylenediphenylisocyanate, m-phenylene diisocyanate, 4-chloro-1,3-phenylene diisocyanate, 4,4′-biphenylene diisocyanate, 1,5-naphthylene diisocyanate, 1,4-tetramethylene diisocyanate, 1,10-decamethylene diisocyanate, 1,4-cyclohexylene diisocyanate, 4,4′-methylene-bis-(cyclohexyl isocyanate) and 1,5-tetrahydronaphthylene diisocyanate.

The organic solvent which is used as a component of these adhesive compositions must be one which is inert to reaction with the organic diisocyanate curing agent and to the active hydrogen atoms of the polyurethane elastomer. It must also be volatile so that it will evaporate within a reasonable time. In general, it should have a boiling range between about 50° C. and about 150° C. At lower temperatures the solvent would boil away too fast to permit satisfactory deposition of the adhesive and under many conditions would cause the condensation of water on the surface due to loss of heat through vaporization of the solvent. This condensation of moisture is very harmful and causes poor adhesion. On the other hand, solvents boiling much above 150° C. evaporate so slowly that an undesirably long time is required before the two pieces can be adhered together. Particularly satisfactory solvents are mixtures of different compounds and are preferred. Typical solvents are tetrahydrofuran, dimethyl formamide, dimethyl sulfoxide, cyclohexanone and anisole. Mixtures of tetrahydrofuran and dimethylformamide and tetrahydrofuran and dimethyl sulfoxide are preferred solvents.

The actual concentration of the polyurethane elastomer, reinforcing agent and curing agent in the solvent is principally a matter of convenience but it is preferred that the cement be not too viscous. If it is too thick and viscous, it will not flow evenly over the surfaces and will leave an irregular deposit. The tendency will also be to leave too much adhesive on the surface. On the other hand, if the dilution is too great, insufficient adhesive is left on the surface. In addition, it is difficult to confine the solution to the surface to be adhered and the surrounding surfaces will be coated with adhesive. It has been found that the range of 800 to 3000 parts of solvent per 100 parts of elastomer constitutes a satisfactory range of concentration, lower molecular weight polymers requiring less of the solvent than the higher molecular weight polymers.

The adhesive compositions of the present invention may be conveniently prepared by dissolving the polyurethane elastomer and organic diisocyanate curing agent in the inert volatile organic solvent, usually in the presence of the conductive channel black or flame silica reinforcing agent. It is convenient to cut the elastomer, which is usually obtained in the form of sheets, into relatively small pieces so as to expose more surface to the action of the solvent. Generally, the mixture of elastomer, organic diisocyanate, carbon black or silica and solvent is put into a closed container and slowly tumbled for 8 to 16 hours. At the end of this time, the elastomer has completely dissolved and a homogeneous, somewhat viscous, cement is obtained. If there are some gel particles left they may be broken up and dispersed by the use of a conventional high speed agitator.

The adhesive composition of the present invention exhibits outstanding utility for adherring a polyurethane elastomer tread stock to itself in the manufacture of tires where a carcass of natural rubber or GR–S is first formed and then the tread stock is put on and the structure cured in a tire mold. More particularly, the elastomer upon which it has been found to be effective in this respect is an elastomer prepared from a polyalkylene ether glycol, an organic diisocyanate and a chain-extending agent such as water. These elastomers are described in U.S. Patent 2,929,800. When the composition of the present invention is used as an adhesive for a tread stock, the appropriate length of tread stock, somewhat less than the circumference of the tire carcass, is cut off the extruded tread stock and skived. Each surface of the cut is coated with the adhesive composition and the solvent is allowed to evaporate. When the adhesive composition is applied to the tread stock, about 30 to 90 minutes is sufficient time to permit solvent evaporation. The standing period should take place in relatively dry air. If the relative humidity is high, the diisocyanate curing agent will react with the moisture in the air and satisfactory adhesion will not be obtained. It is frequently desirable to roll the adhered section with a roller to squeeze out air that may have been trapped when the surfaces were put together. The two ends are then brought together by hand pressure and let stand about half an hour. The bond is then firm and the hoop of elastomer is then spun onto the tire carcass and the assembly put in the tire mold and cured. The splice is found to be as strong as the rest of the tread. Other adhesive compositions omitting one of the ingredients of this composition fail under this operation.

The following examples will better illustrate the nature of the invention. However, the invention is not intended to be limited to these examples. Parts are by weight unless otherwise indicated.

EXAMPLE 1

*Preparation of elastomer*

200 parts of polytetramethylene ether glycol of molecular weight 995 is placed in a Werner-Pfleiderer mixer with 24.0 parts of toluene-2,4-diisocyanate and mixed for 3 hours at 100° C. to form a polyurethane glycol. The mass is cooled to 70–75° C. and 0.39 part of water is added and mixed in for 15 minutes. Then 26.9 parts of toluene-2,4-diisocyanate is added and mixing at 70–75° C. is continued for 2 hours, after which 8.46 parts of water is added. Mixing is continued while the temperature rises to 98° C. The rubbery mass is removed to a rubber roll mill where 1.5 parts of piperidine is added as a stabilization agent and, after thorough mixing, the mass is sheeted off the rolls.

EXAMPLE 2

(a) 100 parts of the elastomer prepared in Example 1 is milled on a rubber roll mill with 20 parts of conductive channel black at about 40° C. for 5–10 minutes and then the mill rolls are heated to 100° C. for 10 minutes. The milling at 100° C. drives out residual moisture. The compounded stock is then sheeted off the mill.

15.5 parts of this compounded stock is cut into small pieces and added to a solution of 4 parts of dimethyl sulfoxide in 100 parts of tetrahydrofuran. This mixture is put into a jar which is tumbled slowly for 16 hours, at which time a clear solution of adhesive cement is obtained containing 13% solids.

To 40 parts of the cement is added 0.087 part of toluene-2,4-diisocyanate which is thoroughly mixed in.

(b) The cement (a) is used to adhere a polyurethane elastomer tread stock prepared by mixing the following formulation on a rubber roll mill:

100 parts of the elastomer of Example 1
15 parts of easy processing channel black
15 parts liquid butadiene-acrylonitrile copolymer, which acts as a plasticizer
3 parts 4,4′-methylenedi-o-tolylisocyanate After thorough mixing, this tread stock is sheeted off the mill. The sheet is cut into one-inch strips. Each strip is cut cleanly on a diagonal through the thickness.

A coating of the cement is applied to each surface of the cut and allowed to stand for one hour for the solvent to evaporate. The surfaces are then pressed together firmly by hand. After standing, without pressure, for 30 minutes, the joint does not fail when pulled at both ends until the elastomer is elongated 350%. After standing 2 days, the strip can be stretched to double its normal length and held so for 24 hours without the splice showing any evidence of failure.

(c) Two sheets of the elastomer of Example 1 are coated with the above adhesive cement and allowed to air-dry for 1 hour. They are then pressed together with a strip of Scotch tape about an inch wide along one edge. After rolling to remove trapped air, the sheets are cured in a press for 1 hour at 134° C. They are then stored at 50% relative humidity for 14 days. The sheets are cut into one-inch strips with the Scotch tape at one end. The Scotch tape prevents the two pieces from adhering and provides a place for engaging the jaws of the Scott tester. The strips are pulled on a Scott tester at a jaw speed of 2 inches per minute. The test is run at 70° C. and the strips are held in an oven at 70° C. for 20 minutes before testing. The bond strengths for 6 strips range between 37 and 40 lbs. per inch.

EXAMPLE 3

(a) 100 parts of the elastomer of Example 1 and 30 parts of flame silica are milled on a rubber mill for 5–10 minutes at about 40° C. and about 10 minutes at 100° C. and then sheeted off the roll. 14.6 parts of the stock, cut up into small pieces, is tumbled 16 hours in a container with 100 parts of tetrahydrofuran and 6 parts of dimethylformamide to form a homogeneous cement. To 40 parts of this cement is added 0.185 part of 4,4′-methylenedi-o-tolylisocyanate which is thoroughly stirred in.

(b) Strips of the tread stock of Example 2(b) are adhered in the same manner as in that example. After 30 minutes' standing, the strip can be elongated to at least 500% before the splice breaks. When elongated to 100% and held, the splice is still intact after 24 hours.

(c) Adhered strips are prepared as in Example 2(c) and cured at 134° C. for 1 hour in a press. After standing 14 days, they are pulled on a Scott tester and show bond strength of 30–34 lbs. per inch at 70° C. in air. By hand tear at room temperature, the elastomer tears raggedly but the bond remains intact.

When the 4,4′-methylenedi-o-tolylisocyanate or the flame silica, or both, is omitted from the adhesive formulation, the splice fails. When both are omitted, the splice formed as in (b) above fails in 5 minutes after elongation to 100%. When the flame silica is omitted and the splice cured as in (c) above, in the hand tear at room temperature, the splice separates clearly and easily.

EXAMPLE 4

(a) 100 parts of the elastomer of Example 1 and 30 parts of conductive channel black are milled together on a rubber mill and finally milled 10 minutes with the rolls at 100° C. The stock is sheeted off. 11.8 parts of the stock, cut in small pieces, 6 parts of dimethylformamide and 100 parts of tetrahydrofuran are tumbled together slowly in a container overnight to form a smooth, homogeneous cement. To 40 parts of the cement is added 0.155 part of 4,4′-methylenedi-o-tolylisocyanate which is thoroughly mixed in.

(b) Strips of the elastomer tread stock of Example 2(b) are cemented together as before using the adhesive cement (a) above. After standing for 30 minutes, it is necessary to stretch the strip to 600% elongation before the bond breaks. After standing 2 days, the strip can be held at 100% elongation for 48 hours without splice failure.

(c) Strips adhered as in Example 2(c) are cured at 134° C. for 1 hour. When tested at 70° C. in air on the Scott tester, they show bond strengths ranging from 28 to 40 lbs. per inch. The hand tear at room temperature results in tearing of the stock rather than the splice.

EXAMPLE 5

(a) 100 parts of the elastomer of Example 1 and 40 parts of flame silica are milled together on a rubber roll mill and finally milled for 10 minutes with the rolls at 100° C. and then sheeted off. 5.1 parts of the above stock, 10 parts of dimethylformamide and 100 parts of tetrahydrofuran are tumbled together slowly in a container for 16 hours to form a homogeneous solution. To 40 parts of this solution is added 0.135 part of 4,4′-methylenediphenyleneisocyanate which is thoroughly stirred in to form an adhesive cement.

(b) A tire tread stock is prepared by milling on a rubber roll mill:

100 parts of the elastomer of Example 1
15 parts easy processing channel black
3 parts 4,4′-methylenedi-o-tolylisocyanate The stock is sheeted off the mill and a sheet is cut into one-inch strips and the strips are cut diagonally to the thickness.

A coating of the adhesive cement (a) is applied to each surface of the cut strips and they are allowed to stand for 1 hour for the solvent to evaporate. The surfaces are then pressed firmly together by hand and let stand for 30 minutes.

One day after preparation, the strips are tested and elongation by stretching up to 1300% does not rupture the splice.

(c) When strips prepared as in Example 2(c) are put into a press and cured for 1 hour at 134° C., strong bonds are formed. A hand tear test at room temperature 5 days after curing shows no rupture of the splice although the adjacent elastomer is torn.

EXAMPLE 6

This example is carried out in a tire manufacturing plant using conventional tire building equipment. The tread stock is prepared by milling the following compositions on an open roll mill:

100 parts of the elastomer of Example 1
15 parts liquid butadiene-acrylonitrile copolymer which acts as a plasticizer
15 parts easy processing channel black
5 parts 4,4′-methylenedi-o-tolylisocyanate The stock is then extruded through an extruder having a 3.25 inch screw operating at 25–30 r.p.m. from which a strip of tread stock approximately 5.5 inches in width and 0.35 inch maximum thickness is obtained.

A tread section is skived with a hot knife at an angle of about 17° from the horizontal and 57.5 inches in length. The two skived surfaces are coated with the adhesive cement of Example 3(a) and allowed to stand for 45 minutes. The surfaces are then joined to form a hoop and the splice is put in a mechanical splice presser where where it is held under pressure, but without heat, for 30 seconds. The hoop is then allowed to stand for 30 minutes. The hop is then spun onto a GR–S tire carcass on a building drum. The tire is then vacuum-bagged and shaped without difficulty. During this process, the hoop is expanded from 57.5 inches to 89.5 inches in circumference. The splice remains intact during this operation and holds without evidence of failure when the tire is kept some time before molding and curing.

As many widely different embodiments of this invention may be made without departing from the spirit and scope thereof, it is to be understood that this invention is not limited to the specific embodiments thereof except as defined in the appended claims.

What is claimed is:

1. An adhesive composition comprising (a) about 100 parts by weight of a polyurethane elastomer prepared from a polyalkylene ether glycol having a molecular weight of from 750 to 3000, a molar excess of an organic diisocyanate and a chain extending agent selected from the group consisting of water and organic compounds containing two functional groups in the molecule to which are attached active hydrogen atoms, said functional groups being capable of reacting with isocyanate groups; (b) from about 20 to 40 parts by weight of a reinforcing agent selected from the group consisting of conductive channel black and flame silica; (c) from 2 to 10 parts by weight of an organic diisocyanate; and (d) from 800 to 3000 parts by weight of an inert volatile organic solvent having a boiling point between about 50° C. and 150° C.

2. An adhesive composition comprising (a) about 100 parts by weight of a polyurethane elastomer prepared from a polytetramethylene ether glycol having a molecular weight of from 750 to 3000, a molar excess of an organic diisocyanate and water; (b) from about 20 to 40 parts by weight of a reinforcing agent selected from the group consisting of conductive channel black and flame silica; (c) from 2 to 10 parts by weight of an organic diisocyanate; and (d) from 800 to 3000 parts by weight of an inert volatile organic solvent having a boiling point between about 50° C. and 150° C.

3. An adhesive composition comprising (a) 100 parts by weight of a polyurethane elastomer prepared from a polyetramethylene ether glycol having a molecular weight of from 750 to 3000, a molar excess of toluene-2,4-diisocyanate and water; (b) about 30 parts by weight of flame silica; (c) about 5 parts by weight of 4,4'-methylenedi-o-tolylisocyanate; and (d) about 890 parts by weight of tetrahydrofuran and 54 parts by weight of dimethylformamide.

4. An adhesive composition comprising (a) 100 parts by weight of a polyurethane elastomer prepared from a polytetramethylene ether glycol having a molecular weight of from 750 to 3000, a molar excess of toluene-2,4-diisocyanate and water; (b) about 30 parts by weight of conductive channel black; (c) about 5 parts by weight of 4,4'-methylenedi-o-tolylisocyanate; and (d) about 1100 parts by weight of tetrahydrofuran and 65 parts by weight of dimethylformamide.

5. A process comprising coating a polyurethane elastomer by applying an adhesive composition to the surface thereof, said elastomer being prepared from a polyalkyleneether glycol, an organic diisocyanate and a chain-extending agent selected from the group consisting of water and organic compounds containing two functional groups in the molecule to which are attached active hydrogen atoms, said functional groups being capable of reacting with isocyanate groups, said adhesive composition comprising (a) about 100 parts by weight of a polyurethane elastomer prepared from a polyalkyleneether glycol having a molecular weight of from 750 to 3000, a molar excess of an organic diisocyanate and a chain-extending agent selected from the group consisting of water and organic compounds containing two functional groups in the molecule to which are attached active hydrogen atoms, said functional groups being capable of reacting with isocyanate groups; (b) from about 20 to 40 parts by weight of a reinforcing agent selected from the group consisting of conductive channel black and flame silica; (c) from 2 to 10 parts by weight of an organic diisocyanate; and (d) from 800 to 3000 parts by weight of an inert volatile organic solvent having a boiling point between about 50° C. and 150° C.; placing a second polyurethane elastomer surface so coated with said adhesive composition adjacent to said first surface and in contact therewith.

6. A process comprising coating a polyurethane elastomer by applying an adhesive composition to the surface thereof, said elastomer being prepared from polytetramethyleneether glycol, toluene-2,4-diisocyanate and water, said adhesive composition comprising (a) about 100 parts by weight of a polyurethane elastomer prepared from a polytetramethyleneether glycol having a molecular weight of from 750 to 3000, a molar excess of an organic diisocyanate, and water; (b) from about 20 to 40 parts by weight of a reinforcing agent selected from the group consisting of conductive channel black and flame silica; (c) from 2 to 10 parts by weight of an organic diisocyanate; and (d) from 800 to 3000 parts by weight of an inert volatile organic solvent having a boiling point between about 50° C. and 150° C.; placing a second polyurethane elastomer surface so coated with said adhesive composition adjacent to said first surface and in contact therewith.

References Cited in the file of this patent

UNITED STATES PATENTS

| | | |
|---|---|---|
| 2,284,637 | Catlin | June 2, 1942 |
| 2,531,392 | Breslow | Nov. 28, 1950 |
| 2,625,532 | Seegar | Jan. 13, 1953 |
| 2,720,479 | Crawford et al. | Oct. 11, 1955 |
| 2,734,045 | Nelson | Feb. 7, 1956 |
| 2,843,568 | Benning et al. | July 15, 1958 |